W. McCONWAY.
CAR WHEELS.

No. 180,725.          Patented Aug. 8, 1876.

Witnesses
H. J. Mann
Claudius L. Parker

Inventor: William McConway,
by George H. Christy
his Atty.

UNITED STATES PATENT OFFICE.

WILLIAM McCONWAY, OF PITTSBURG, PENNSYLVANIA.

IMPROVEMENT IN CAR-WHEELS.

Specification forming part of Letters Patent No. 180,725, dated August 8, 1876; application filed April 20, 1876.

*To all whom it may concern:*

Be it known that I, WILLIAM MCCONWAY, of Pittsburg, county of Allegheny, State of Pennsylvania, have invented or discovered a new and useful Improvement in Car-Wheels; and I do hereby declare the following to be a full, clear, concise, and exact description thereof, reference being had to the accompanying drawing, making a part of this specification, in which—like letters indicating like parts—

Figure 1:
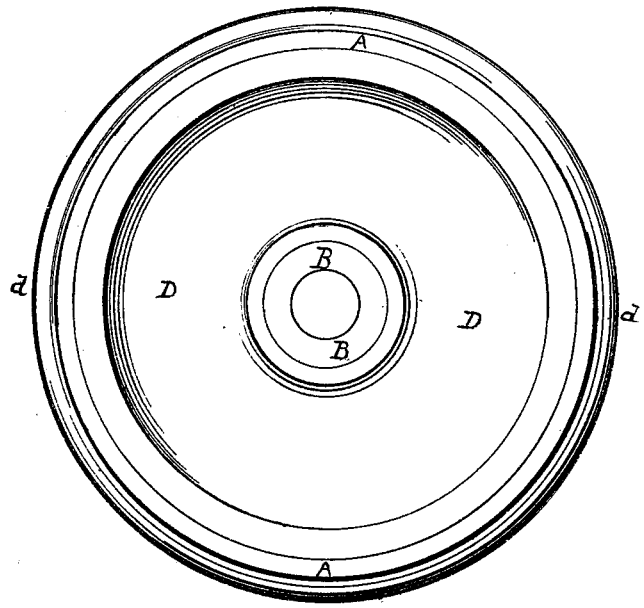
Figure 2:
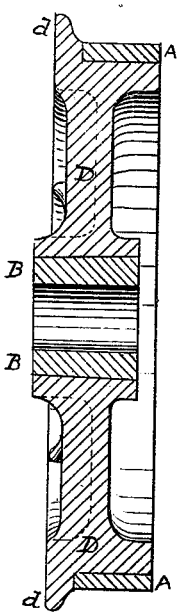
Figure 3:
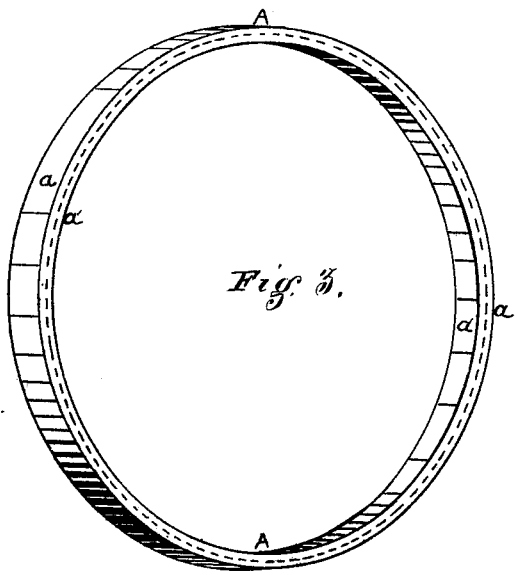
Figure 4:
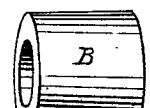

Figure 1 is an inside face view of my improved wheel. Fig. 2 is a sectional view thereof. Fig. 3 is a perspective view of the tire, and Fig. 4 is a like view of the hub.

My invention relates to an improved construction of wheels for railway-vehicles, in which a cast malleable-iron body is combined with a cast-iron hub and with a tire or tread of iron-backed steel. The hub B is made of cast-iron in any of the ways known to the art. The body D of the wheel is made of cast malleable iron, including, by preference, the flange d. This body is pressed or shrunk onto the hub in the usual or any known way. The tire or tread A is made of two layers of metal, the outer one, a, being of steel, and the inner one, a', being of iron, the two layers being united by welding under the hammer or rolls, or by casting the one metal onto the other, as practiced in making a like combination of metals for other uses in the arts. Preferably, I cast the two metals one onto the other, with both in an annular form, in the condition of an ingot or billet, and then roll it out in the manner common in rolling steel locomotive-tire. The tire thus made is shrunk or pressed onto the body D, so as to be retained securely in place. The steel layer a gives a durable wearing-face to the wheel, and the iron back a' gives it the necessary tensile strength. When it wears out it is replaced with a new one, or its working face can be turned down to remove slight irregularities of wear. The body D, being made of cast malleable iron, possesses the requisite strength, combined with greater toughness than can be secured in the ordinary cast-iron wheel, so as to be less liable to break, and can be made at much less cost than a wrought-iron wheel.

For many purposes, equal strength can be secured with less weight of metal.

The wheel, when complete, is shrunk or pressed onto the axle in the usual way.

Iron-center steel may be used instead of iron-backed steel in making the tire, if so preferred.

One advantage derived from the cast-iron hub arises from the ease with which cast-iron can be bored out as compared with cast malleable iron; and it also facilitates greatly the annealing of the malleable part of the wheel, to have it of as small a bulk or mass as possible, which I do by making the hub of cast-iron and the tread of combined iron and steel, as set forth.

While the combined iron and steel is the best for the tire, an ordinary steel tire may be substituted in the combination of a tire, hub, and malleable-iron body, and the flange d, instead of forming a part of the body, may be made as a part of the tire.

I am aware that a steel tread has been welded onto a locomotive-tire and onto the rim of a car-wheel, such car-wheel rims being connected with two-part cast hubs by wrought-metal plates; also, that a hard-metal rim and body have been cast onto a cast hub of softer metal. To such constructions I make no claim.

I claim herein as my invention—

1. The combination, in a car-wheel, of a cast-iron hub, a cast malleable-iron body, and a tire composed wholly or in part of steel, made separately and secured thereon, substantially as set forth.

2. The combination of a cast iron hub and a cast malleable body, substantially as set forth.

In testimony whereof I have hereunto set my hand.

WILLIAM McCONWAY.

Witnesses:
CLAUDIUS L. PARKER,
GEORGE H. CHRISTY.